United States Patent [19]

Davis

[11] Patent Number: 5,664,224

[45] Date of Patent: Sep. 2, 1997

[54] APPARATUS FOR SELECTIVELY LOADING DATA BLOCKS FROM CD-ROM DISKS TO BUFFER SEGMENTS USING DMA OPERATIONS

[75] Inventor: Hedley Davis, Freemont, Calif.

[73] Assignee: Escom AG, Heppenheim, Germany

[21] Appl. No.: 573,649

[22] Filed: Dec. 18, 1995

Related U.S. Application Data

[63] Continuation of Ser. No. 96,339, Jul. 23, 1993, abandoned.

[51] Int. Cl.$^6$ .................................................. G06F 13/28
[52] U.S. Cl. .......................... 395/842; 711/112; 711/165
[58] Field of Search .................................. 395/842–848, 395/200.07, 492, 439

[56] References Cited

U.S. PATENT DOCUMENTS

| | | | |
|---|---|---|---|
| 3,946,366 | 3/1976 | Edwards, Jr. | 395/400 |
| 4,737,908 | 4/1988 | Shinohara et al. | 395/250 |
| 4,747,038 | 5/1988 | Bradley et al. | 395/250 |
| 4,754,399 | 6/1988 | Yamamoto et al. | 395/250 |
| 4,779,223 | 10/1988 | Asai et al. | 395/425 |
| 4,788,660 | 11/1988 | Arizono | 395/250 |
| 4,803,616 | 2/1989 | Uchiyama et al. | 395/250 |
| 4,860,244 | 8/1989 | Bruckert et al. | 395/250 |
| 4,903,219 | 2/1990 | Reynolds et al. | 364/550 |
| 4,975,873 | 12/1990 | Nakabayashi et al. | 365/49 |
| 5,060,137 | 10/1991 | Bryg et al. | 395/250 |
| 5,072,365 | 12/1991 | Burgess et al. | 395/725 |
| 5,121,667 | 6/1992 | Emery et al. | 84/603 |
| 5,134,563 | 7/1992 | Tayler et al. | 395/250 |
| 5,136,692 | 8/1992 | Barrett et al. | 395/250 |
| 5,146,564 | 9/1992 | Evans et al. | 395/250 |
| 5,150,465 | 9/1992 | Bush et al. | 395/275 |
| 5,150,474 | 9/1992 | Kaneko | 395/500 |
| 5,155,811 | 10/1992 | Dean et al. | 395/250 |
| 5,161,215 | 11/1992 | Kouda et al. | 395/250 |
| 5,163,144 | 11/1992 | Ikeno | 395/425 |
| 5,179,642 | 1/1993 | Komatsu | 395/135 |
| 5,179,662 | 1/1993 | Corrigan et al. | 395/250 |
| 5,179,679 | 1/1993 | Shoemaker | 395/425 |
| 5,195,093 | 3/1993 | Tarrab et al. | 371/3 |
| 5,206,943 | 4/1993 | Callison et al. | 395/425 |
| 5,257,023 | 10/1993 | Furuya | 340/995 |
| 5,261,072 | 11/1993 | Siegel | 395/425 |
| 5,293,606 | 3/1994 | Sassenrath | 395/425 |
| 5,367,705 | 11/1994 | Sites et al. | 395/800 |
| 5,412,667 | 5/1995 | Havemose | 371/37.5 |

FOREIGN PATENT DOCUMENTS 4-205678  7/1992  Japan.

OTHER PUBLICATIONS

Mano., Computer System Architecture, 2nd Ed., pp. 124–125, 1982.

Williams, The Next architecture: design for the '90s?, Computer Design, v27, n22, p. 27(2) Dec. 1988.

*Primary Examiner*—Matthew M. Kim
*Attorney, Agent, or Firm*—Ratner & Prestia

[57] ABSTRACT

A data processing system including a buffer memory having a plurality of segments for storing data and a memory location pointer having a plurality of bits, where each of the memory location pointer bits corresponds to a respectively different one of the buffer segments. The data processing system includes a central processing unit that writes binary data values into the memory location pointer to indicate availability of each of the buffer segments. A direct memory access controller unit continually transfers blocks of data from a mass storage device into the available buffer segments as indicated by the memory location pointer. The DMA controller further changes the state of the binary values, corresponding to the segments into which the blocks of data were stored, to indicate that the segments are not available for data transfer. The data processing system identifies each block of data, as it is stored in different buffer segment locations, to match the transferred block of data to the requests for data from the storage device.

8 Claims, 2 Drawing Sheets

APPARATUS FOR SELECTIVELY LOADING DATA BLOCKS FROM CD-ROM DISKS TO BUFFER SEGMENTS USING DMA OPERATIONS

This application is a continuation of application Ser. No. 08/096,339 filed Jul. 23, 1993, now abandoned.

BACKGROUND OF THE INVENTION

The present invention relates to retrieving data from a mass storage device, specifically to the operation of a pointing device which directs traffic in transferring blocks of data from the mass storage device to a buffer memory region.

The advent of large mass storage media associated with personal computers has resulted in demand for more efficient means to access data for processing. The main objective of the present invention is to provide an efficient and cost effective way of channeling blocks of data from a large but slow storage medium (i.e., tape drives, compact disk read-only-memory, etc.) into a faster main memory region for immediate processing by the central processing unit.

In general, input and output (I/O) operations to mass storage devices are controlled through the operating system of the computer. A user task which needs data from one of these devices requests the data by invoking a system function which is defined in the operating system. This function may, for example, invoke the memory management function of the operating system to allocate a buffer to receive the requested data; translate the user's request into an I/O command; and send the command to the controller for the requested device. When the device controller has transferred the requested data, another operating system routine may be invoked to ensure that the operation completed without error and to notify the user task that the requested data is available.

In some computer systems, disk caching or buffering schemes are used to speed-up access to a large mass of data from a slow storage unit. For example, the patent to Barret et al. (U.S. Pat. No. 5,136,692) concerns a storage driver which includes multiple memory buffers designed to hold data retrieved from a disk storage device. The storage driver sequentially reads data blocks from the disc and stores the blocks in the buffers. Here, the storage driver additionally accesses non-requested data in anticipation of future requests by the system. The buffers containing data are marked as available for processing as soon as the processor command which reserved the blocks is no longer active. Non-requested data typically remain in buffers until requested by the processor. However, in the event no request for this extra data is made by the processor and a buffer is needed for a new I/O request, this non-requested extra data is overwritten to make room for the new data.

These existing methods of handling I/O operations to mass storage devices require excessive system software involvement by requiring each I/O operation to be both initialized and terminated, forcing undesirable transfer delays. The operation is further delayed by the need to allocate and reserve the I/O buffers.

SUMMARY OF THE INVENTION

In accordance with the present invention, multiple segments of buffer memory are pre-allocated within the main memory section of a computer system and reserved for use as a mass-storage buffer. A direct memory access (DMA) controller is provided to manage the retrieval of data from the mass storage source to the reserved buffer area.

One component of the DMA controller is a multiple bit memory location pointer which operates as an interface between the memory buffers and the DMA controller. Each of the location pointer bits corresponds to a buffer segment and indicates whether the segment is available for accepting data. Using the memory location pointer, the operating system can allocate the reserved buffer segments to receive data from the mass storage device. The operating system cannot, however, deallocate or reserve buffers.

At system initialization, the memory location pointer bits are initially cleared, which effectively deallocates all of the buffers. In response to a request for data from the mass storage device, the CPU writes a multiple-bit binary word into the memory location pointer and sets a requested number of bits high to allocate buffer segments, if available, to receive the requested data. The CPU maintains a copy of the memory location pointer in a region of the main memory which is reserved for keeping track of the memory location pointer status.

To begin accessing data, the DMA controller transfers sectors of requested data from the mass storage device to the buffer segments corresponding to high bits of the memory location pointer. After the controller has transferred the data to a buffer segment, it resets the corresponding pointer bit to prevent the data in the buffer from being overwritten before it can be used by the requesting process. The controller then interrupts the CPU to trigger processing the requested data. The operating system compares the memory location pointer bits with the mask bits and determines which buffer segments were cleared by the controller. The operating system then correlates header information of the stored data with the data request and allows the requested process to access the data.

DETAILED DESCRIPTION OF THE INVENTION

The present invention describes a transfer operation of large volume data retrieved from a compact disk read-only-memory (CD-ROM) to an area of main memory in a personal computer. The invention may easily be adapted for use with variety of other storage sources such as tape or disk drives.

In an exemplary embodiment of the invention, a direct memory access (DMA) controller 105 is provided to manage the flow of data between CD-ROM and a buffer region of main memory for storing the data requested by the process. The DMA controller includes a multiple-bit memory location pointer (MLP), which is used to keep track of buffer allocation and reservation in the buffer region. The buffer region consists of multiple segments of memory, where each segment corresponds to one of the bits of the MLP. The DMA controller transfers sectors of requested data into available buffer segments as indicated by the set bits of the MLP.

Figure 1:
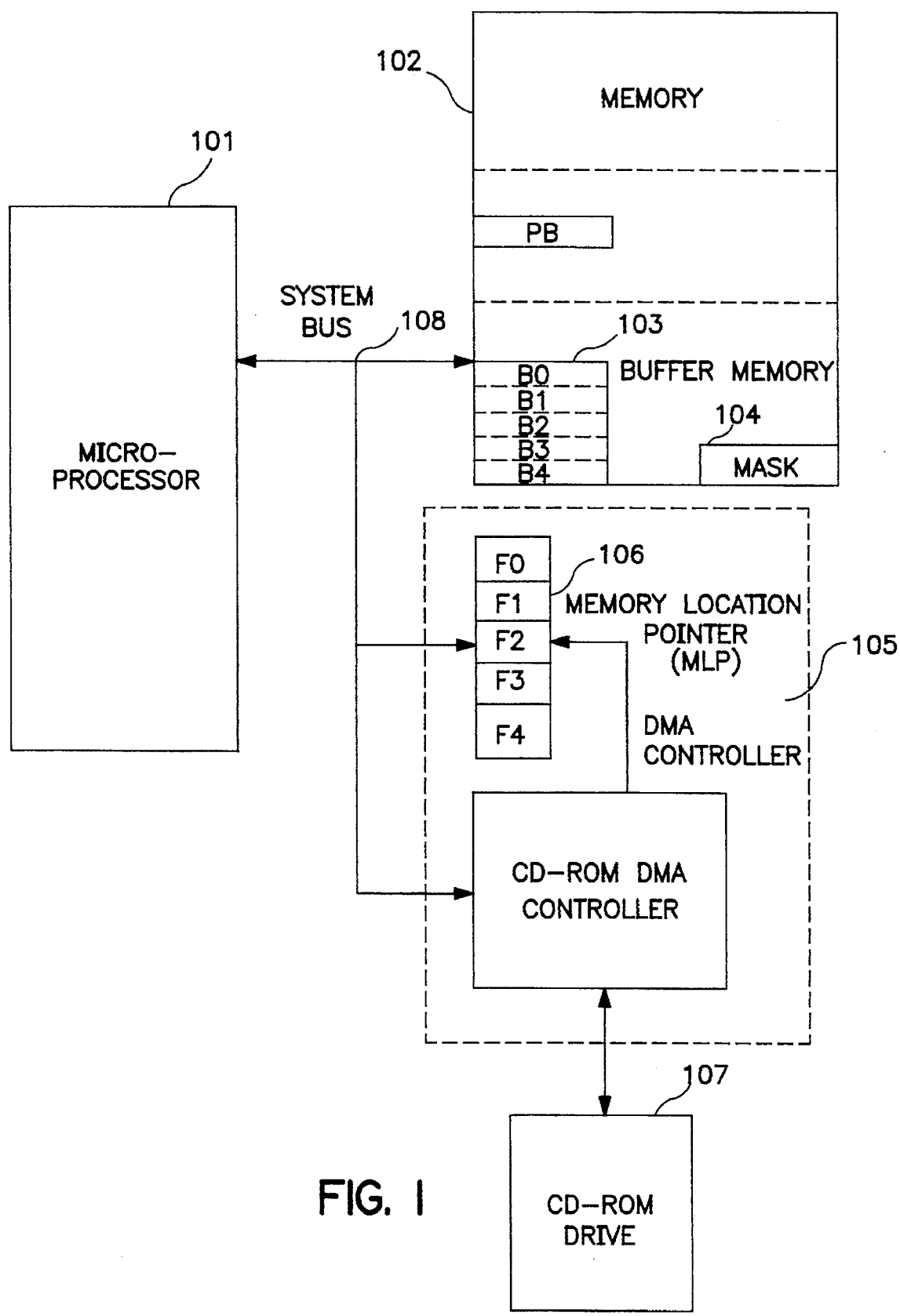
FIG. 1 is a block diagram of the data processing system including the invention.

FIG. 1 shows a block diagram of an exemplary data processing system which includes an embodiment of the subject invention. The system consists of a microprocessor central processing unit (CPU) 101, a main memory section 102, which includes buffer memory 103 and a separate memory location reserved for storing buffer status (MASK) 104, the DMA controller 105, which includes the MLP 106, and finally a compact disk read-only-memory (CD-ROM) device 107. All communication between the CPU 101, memory 102 and DMA controller 105 is via a system bus 108. In the exemplary embodiment of the invention, this is a 32 bit bus which is used to transfer data and addresses.

In the exemplary embodiment, each of the buffer segments is 4K bytes long and a total of 64K bytes of buffer space is allocated. Accordingly, the MLP consists of a 16-bit register, where each bit corresponds to one 4K byte segment of the buffer space. In the exemplary embodiment, as shown in FIG. 1, only five buffer segments are shown. Thus, the MLP 106 shown in FIG. 1 is a five-bit register. Each of the bits in the MLP 106 corresponds to a respectively different one of the buffers in the buffer area 103. In the example shown in FIG. 1, bit F0 indicates the availability of buffer B0, and bits F1, F2, F3 and F4 indicate the availability of buffers B1, B2, B3 and B4, respectively.

Figure 2:
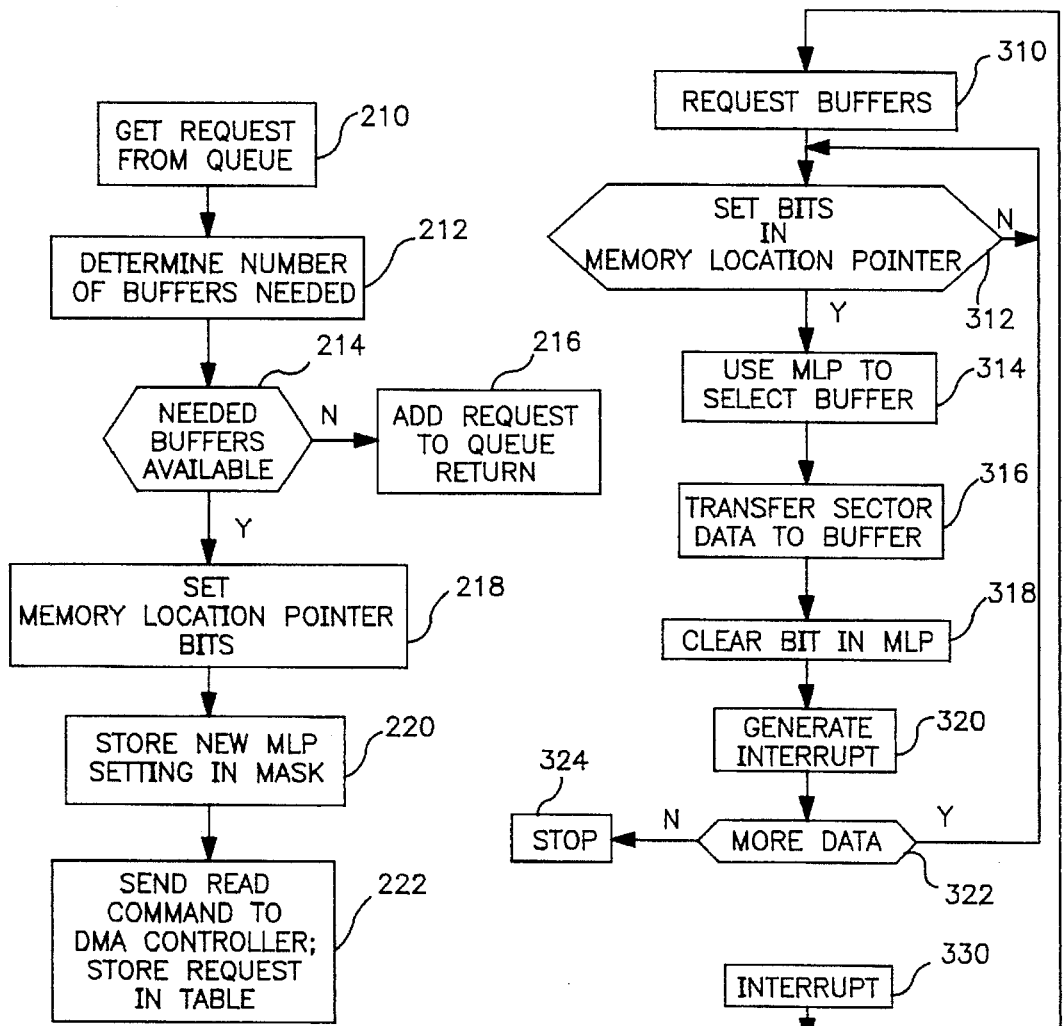
FIG. 2 is a flow chart illustrating the CPU procedure for selecting open buffer space.

FIG. 2 is a flow chart which shows how the CPU 101 allocates required buffer space. The CPU has the capacity to write a 16-bit binary word into the memory location pointer. A value of logic-zero in a bit location (a clearer bit) of the MLP 106 indicates that the corresponding buffer segment is available to receive data. Similarly, a value of logic-one in the bit-location (a set bit) indicates that the corresponding buffer segment is reserved and is currently not available to receive data. When the CPU writes a binary word, each logic-one value in the binary word sets a corresponding pointer bit to logic-one, whereas the logic-zero bits have no effect on the existing value of the pointer bit. A set pointer bit can only be cleared by the DMA controller 105. The CPU 101 cannot clear a bit once it is set.

In FIG. 2, the process of allocating buffer space begins at step 210 which takes the first request from the top of the queue. These requests are entered into the queue by the operating system, as described below. Each request includes a desired number of buffer segments and a requesting task identifier. In response to a request to obtain data which has been stored on the CD-ROM 107, the operating system invokes the procedure shown in FIG. 2. The number of buffers that are requested represent a number of segments of the CD-ROM data that are brought into memory in response to a read request. In general, only one of the sectors will have been requested by the user task. The other sectors are read to implement a disk buffering scheme.

When the system has Just been initialized, the all of the bits of the MLP 106 memory location pointer are cleared. This operation is performed by the DMA controller 105 at system power-up. The CPU 101, at step 212, determines the number of buffers that were requested by the application. At step 214, the CPU reads the MLP word to determine if the requested number of buffers are available. Since the operating system running on the computer system shown in FIG. 1 allows multiprocessing, more than one process may be active, each accessing a different portion of the CD-ROM data.

If the requested number of buffers are not available at step 214 (i.e. the number of zero-valued bits in the MLP 106 is less than the requested number of buffers), step 216 is executed which returns the request to the queue and returns control to the operating system. If, at step 214, the requested number of buffers are available, the operating system, at step 218 sets the appropriate bits in the MLP 106. At step 220, the new value of the MLP 106 is saved in the MASK word 104. At step 222, the read command is sent to the DMA controller 105 and data on the read command is stored in a table. This data includes the sectors that were requested and an identifier for the application task that asked for the data. The information in this table is used, as described below, to match the sectors read into the buffers to their requesting tasks.

A number of sequential read commands may be sent to the DMA controller. In the instance where only a single sector of the CD-ROM is needed, only a single buffer is allocated and the read command instructs the CD-ROM device 107 to provide a single sector.

Where multiple sequential sector are requested, for example, when data representing audio or video information is to be read from the CD-ROM 107, the operating system only sends the initial read command to the CD-ROM controller 105 and then sends the stop command when requested by the application. During the interval between the initial read command and the stop command, the controller 105 continually, and without intervention by the operating system, reads the next sector into the next available buffer.

Figure 3:
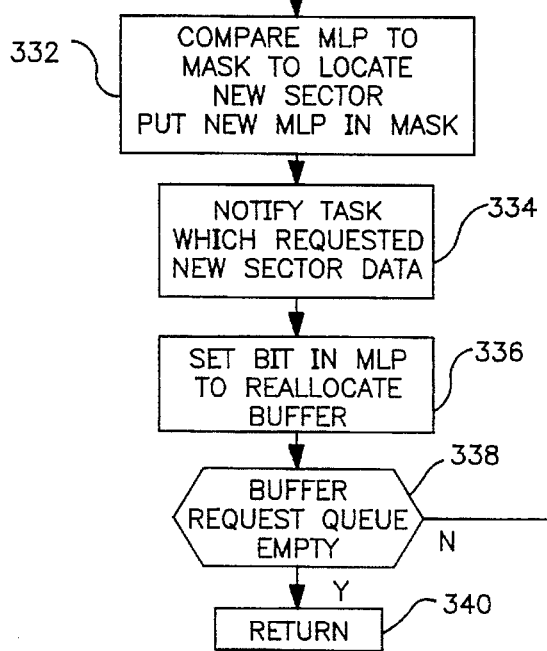
FIG. 3 is a flow chart illustrating the overall data accessing procedure.

FIG. 3 shows a flow chart of the overall data-accessing process. This process includes operations performed by the CPU under control of the operating system (steps 330–340) and the application task and operations performed by the CD-ROM DMA controller 105 (steps 310–324).

In step 310, when data is requested for processing, the system immediately looks for available buffer segments in the buffer space 103. As described in the foregoing discussion of FIG. 2, the availability of each buffer segment is indicated by the individual MLP bits. In the exemplary embodiment of the invention, the buffers are requested by invoking the task described above, with reference to FIG. 2.

At step 312, if at least some of the bits in the MLP 106 have logic-one values, data transfer begins or continues in the DMA controller 105 at step 314. Steps 312 through 322 represent a continuing process performed by the DMA controller 105. Once started, this process will only stop if an explicit stop command is issued by the operating system. When all of the bit positions of the MLP 106 are reset, the controller 105 loops on step 312 until it finds a logic-one bit in the MLP 106.

In step 314, the controller 105 selects a buffer into which it will transfer the next sector. It does this by examining the MLP 106 and locating a bit-location having a logic-one value. As described above, the bit-locations in the MLP 106 have a one-to-one relationship with the buffers in the buffer area 103. The controller 105 may select buffers either at random or according to some fixed priority scheme. It may be desirable, for example, to continually cycle through the buffers B0 through B4, selecting only those buffers which have a logic-one in the corresponding bit location of the MLP 106. This cycling through the buffers may, for example, helps to ensure that data transferred into a buffer is processed before the buffer is overwritten with new data.

Next, at step 316, the requested sector of data is transferred into the selected buffer and, at step 318, the bit location in the MLP 106 which corresponds to the selected buffer is cleared. As a final step in the process, the DMA controller 105 interrupts the CPU 101 to inform it that the data transfer operation is complete.

At step 322, the DMA controller determines if the command that is currently being processed was to read multiple sectors. If so, control is transferred to step 312 to select a buffer to hold the next sector. If, however, the command was to read a single sector or to stop, control is transferred to step 324 which stops the controller until a new command is issued by the CPU 101 under control of the operating system.

Steps 330 through 340 represent the processing performed by the operating system in response to the interrupt generated at step 320. At step 330, the interrupt invokes the interrupt handling routine of the operating system running on the CPU 101. The first step in this routine, step 332, compares the current value held by the MLP 106 to the value stored in the MASK 104 to determine which buffer contains the new data. Once this has been determined, the new value of MLP 106 is stored in MASK 104.

At step 334, the interrupt routine compares the information in the header to data on the outstanding read operations that was stored in the table at step 222 of FIG. 2. This step determines which application task needs to be awakened to process the newly returned data. The task is awakened at step 334 and, then, at step 336, the bit corresponding to the buffer is set in the MLP 106. At step 338, the operating system determines if there are any unsatisfied read requests having entries in the buffer request queue. If so, it schedules an invocation of step 310 to attempt to allocate buffer space for these requests. If the buffer request queue is empty, the interrupt routine returns control to the interrupted program.

The invention described above has advantages over the traditional methods of handling I/O requests since it relieves the operating system of much of the housekeeping burdens. The operating system is only involved in a multi-sector I/O operation to initiate the operation, to link each returned sector to its requesting task and to terminate the operation.

While the invention has been described in terms of an exemplary embodiment, it is contemplated that it may be practiced, as outlined above, with variations within the spirit and scope of the appended claims.

The invention claimed is:

1. A data processing system comprising:
   (a) means for receiving requests for data from a storage device,
   (b) a buffer memory having a plurality of segments for storing data in a main memory,
   (c) a memory location pointer having a plurality of bits, wherein each of the plurality of bits corresponds to a respectively different one of said plurality of segments,
   (d) a central processing unit including means for writing binary data values into said memory location pointer, wherein said binary data values indicate availability of each of said plurality of segments for data transfer, and
   (e) a DMA controller unit which includes:
      means for managing a direct memory access by directly reading blocks of data from the storage device and for transferring the blocks of data into selected ones of said plurality of segments responsive to the corresponding bits of the memory location pointer, and
      means for changing the binary values corresponding to the segments into which the blocks of data were stored to indicate that the segments are currently not available for data transfer.

2. The data processing system according to claim 1 further comprising:
   (a) a masking memory which holds at least one of the binary data values as stored in the memory location pointer, and
   (b) comparing means for determining the availability of said plurality of segments by comparing the binary data values currently stored in the memory location pointer to the binary data values held by the masking memory, wherein said comparing means includes an exclusive OR circuit to determine differences between the binary data values of the memory location pointer and the binary data values of the masking memory.

3. The data processing system according to claim 1 wherein each of the blocks of data includes a header, the system further comprising data-identifying means for reading the header of each of the transferred blocks of data to match each of said blocks of data to one of the requests for data from the storage device.

4. The data processing system according to claim 3 further comprising means for interrupting the central processing unit upon completion of one of the transfers of a block of data to cause the data processing system to invoke the data-identifying means to match the transferred block of data to the one of the requests for data from the storage device.

5. A data processing system comprising:
   (a) a central process unit for receiving requests for data from a CD-ROM device,
   (b) a buffer memory having a plurality of segments for storing data in a main memory,
   (c) a memory location pointer having a plurality of bits, wherein each of the plurality of bits corresponds to a respectively different one of said plurality of segments,
   (d) said central processing unit including means for writing binary data values into said memory location pointer, wherein said binary data values indicate availability of each of said plurality of segments for data transfer, and
   (e) a DMA controller unit which includes:
      means for managing a direct memory access by directly reading blocks of data from the CD-ROM device and for transferring the blocks of data into selected ones of said plurality of segments responsive to the corresponding bits of the memory location pointer, and
      means for changing the binary values corresponding to the segments into which the blocks of data were stored to indicate that the segments are currently not available for data transfer.

6. The data processing system according to claim 5 further comprising:
   (a) a masking memory which holds at least one of the binary data values as stored in the memory location pointer, and
   (b) comparing means for determining the availability of said plurality of segments by comparing the binary data values currently stored in the memory location pointer to the binary data values held by the masking memory, wherein said comparing means includes an exclusive OR circuit to determine differences between the binary data values of the memory location pointer and the binary data values of the masking memory.

7. The data processing system according to claim 5 wherein each of the blocks has a respective header, the system further comprising data-identifying means for reading the header of each of the transferred blocks of data to match each of said blocks of data to a one of the requests for data from the CD-ROM device.

8. The data processing system according to claim 7 further comprising means for interrupting the central processing unit upon completion of one of the transfers of a block of data to cause the data processing system to invoke the data-identifying means to match the transferred block of data to the one of the requests for data from the CD-ROM device.

* * * * *